Oct. 19, 1965 E. I. VALYI 3,212,573

COMPOSITE METAL STRUCTURE

Filed Feb. 1, 1963

INVENTOR.
EMERY I. VALYI
BY
Robert H. Bachman
ATTORNEY

United States Patent Office 3,212,573
Patented Oct. 19, 1965

3,212,573
COMPOSITE METAL STRUCTURE
Emery I. Valyi, Riverdale, N.Y., assignor to Olin Mathieson Chemical Corporation, a corporation of Virginia
Filed Feb. 1, 1963, Ser. No. 255,580
4 Claims. (Cl. 165—185)

The present invention relates to composite structures formed by joining a body of porous permeable material to a base of solid material and, more particularly, of a porous metal element to a base of solid sheet metal.

Structures of the above type are disclosed in United States Patent 3,049,795, issued August 21, 1962, and co-pending application Serial No. 202,612, filed June 14, 1962. The patent and co-pending application disclose, inter alia, a process which comprises interposing a system of fluid conducting channels or passages between a layer of permeable material, such as compacted, sintered metal aggregate, and another layer of solid material. The permeable material is joined to the solid material in the areas other than the interposed passages, resulting in a composite structure containing fluid conductive passages therein. This type of structure is adapted for use, for example, in burners whereby a combustible gas may be distributed through the passages so that it reaches the permeable structure and upon penetrating therethrough is ignited over a large area. The same type of structure is also adapted for use in heat exchangers whereby heat transfer is effected from a fluid which is in contact with the solid component of the structure to another fluid which is in contact with the porous components, advantage being taken on the large specific area offered by the porous components. The elements disclosed in the above patent and co-pending patent application, while satisfactorily serving the purposes for which they are intended, do not reach as great an efficiency as may be attained in this type of structure.

Accordingly, it is an object of the present invention to provide an improved composite structure and an improved process for making composite structures having a porous body metallically joined to a solid sheet metal backing member.

It is a further object of the present invention to provide a novel process as aforesaid which produces a composite metal structure having increased heat transfer surface, having a high degree of porosity and being inexpensive to produce.

Other objects and advantages of this invention will appear hereinafter.

Broadly speaking, the present invention resides in a method of making an improved composite metal structure which comprises providing an impervious metal body, forming an assembly by superimposing thereon a sinterable body of metallic particles, at least half and preferably substantially all of said metallic particles being hollow, and sintering said body of metallic particles to produce a porous, sintered body of metallic particles which is bonded to said impervious metal body. The preferred hollow particles used are those which are open-ended and have passages therethrough.

It has been found in accordance with the process of the present invention that numerous highly desirable advantages are readily and expeditiously obtained by providing hollow metallic particles. For any given unit of volume, the solid sphere represents the minimum surface area attainable and thus the provision of hollow spherical particles represents a substantial increase in surface area for the identical weight of metal compared to solid particles of equal dimensions. Thus, whenever the solid particles, previously described in the aforementioned United States Patent 3,049,795, are replaced by hollow particles, the aggregate surface area of the porous element in structures such as here referred to will increase materially, thereby greatly enhancing the heat transfer characteristics of the composite. In addition, when the hollow particles used are open-ended and have passages therethrough, the pressure drop is greatly reduced compared to the same particles in their solid form. Thus, with particles of this type, greater porosity is obtained and fluid will flow more readily through the composite structure. In addition, since the particles of the present invention are hollow, they contain less metal and therefore tend to be more economical in many instances than solid particles. Further, some metals and alloys do not readily form solid spheres or other predetermined shapes, for example, stainless steel and aluminum, and therefore with regard to these materials, the process of the present invention represents a distinct advantage in obtaining the desired particle shape.

Figure 1:
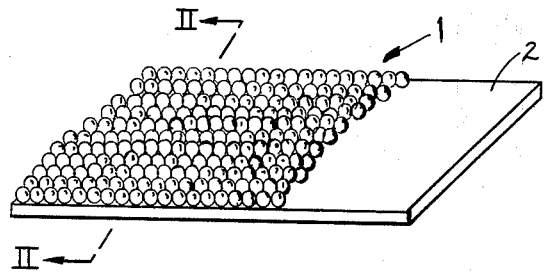
FIGURE 1 is a perspective view partly in section illustrating one embodiment of this invention.

Referring to the drawings, FIGURE 1 shows a sinterable body of metallic particles 1 superimposed on a solid sheet metal backing element 2 representing the components to be fabricated into the desired composite. The porous body may comprise any sinterable body of metallic particles at least half of which are hollow and preferably substantially all of which are hollow. The particles may take any desired shape, that is, they may be solid on the outer portions and hollow on the interior portions, they may be open-ended and contain passages therethrough similar to those forming bead-chains, or they may take any number of other shapes. In the preferred embodiment the particles contain passages therethrough, such as the bead-chain type. The particles may be made, for example, from aluminum, copper, nickel and alloys thereof, stainless steels, various ferrous alloys and other like materials. The porous body may be suitably sintered into the desired form prior to being placed upon the improved metallic body. Alternatively, the porous body may be placed in a form and sintered directly on the impervious metal body.

Figure 2:
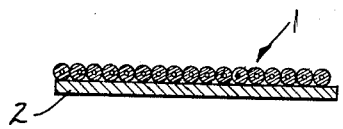
FIGURE 2 is a section taken along the lines II—II of FIGURE 1.
Figure 3:
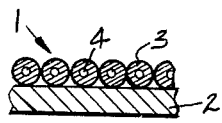
FIGURE 3 is an enlarged portion of the structure shown in FIGURE 2.

As shown in FIGURES 2 and 3 the impervious metal body 2 contains superimposed thereon a sinterable body 1 comprised of metallic particles 3 having hollow portions therein 4.

Figure 4:
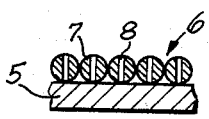
FIGURE 4 is an enlarged portion of the structure shown in FIGURE 2 representing another embodiment of the present invention.
Figure 5:
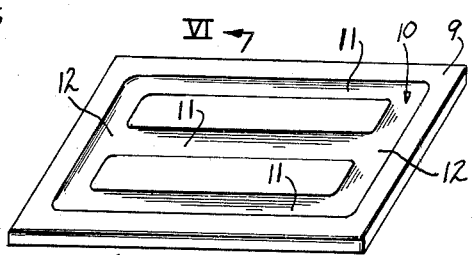
FIGURES 5 through 9 illustrate various stages of another embodiment of this invention.
Figure 6:
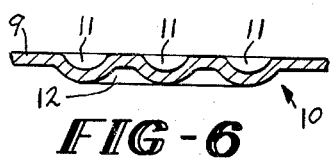
Figure 7:
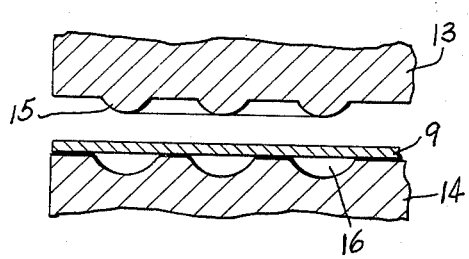
Figure 8:
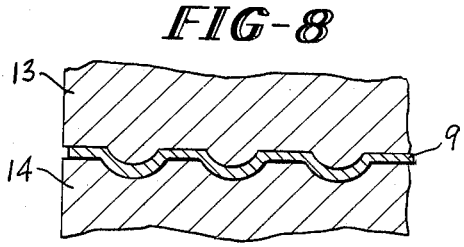
Figure 9:
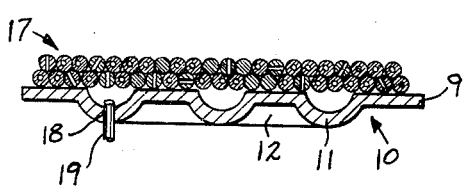

The modification of FIGURE 4 shows impervious metal body 5 having superimposed thereon a sinterable body 6 comprised of metallic particles 7 which particles are open-ended so that they contain passages 8 therethrough.

The aforementioned U.S. Patent 3,049,795 and copending patent application Serial No. 202,612 teach methods for fabricating composite structures generally referred to herein. Thus, there is described a process in which fluid channels are formed in a metal sheet by suitable embossments thereof to form groove-like indentations for the desired system of fluid channels and a shet like porous body of metal aggregate is metallically bonded to said metal sheet. The process of the present invention is similar to the aforesaid patent and co-pending application was the included novel feature of utilizing hollow metallic particles with the resultant attendant advantages discussed hereinabove.

The process of the present invention thus encompasses, as modifications thereof, embossing a sheet metal member to form groove-like indentations therein protruding out of one face of said member and superimposing thereon the sintered sheet-like porous body of metallic particles of the present invention. The porous body is superimposed on the opposite face of said member and is metallically bonded to the unembossed portions of the member whereby said indentations form channels for flow of a fluid therethrough. This is shown in FIGURES 5 through 9 wherein a metal sheet 9 is suitably embossed at 10 in a pattern corresponding to a desired system of fluid channels desired for the distribution of a fluid in the ultimate structure. For example, the embossment may comprise a plurality of co-extending tubes 11 interconnected at each adjacent end by a transversely extending portion of header 12 However, it is to be understood that although a simple pattern has been illustrated, it may nevertheless be of any configuration and any degree of intricacy. In addition, the embossments may be provided in accordance with any of the conventional practices known in the art, for example, they may be formed between a pair of complementary dies 13 and 14 which are mounted in operative relationship to conventional reciprocating presses, not shown, such as normally used for punching or embossing. In the usual manner, when dies 13 and 14 are closed against sheet 9, a pattern corresponding to the die impressions 15 and 16 will be impressed in strip 9. It is noted that the embossing may also be accomplished in a continuous manner, for example, strip 9 may be continuously fed between a pair of rolls having their cooperating surfaces machined to a pattern corresponding to the desired die impression.

Subsequent to the provision of the desired embossments in metal sheet 9 a sheet-like, preform body of sintered porous metal particles 17, at least half of which being hollow, is superimposed on sheet 9 so as to dispose the groove-like indentations of the embossments in extension away from the sintered porous body 17.

In this manner, these groove-like indentations will protrude out of an external face of the assembly. Subsequently, the embossed sheet metal member 9 is suitably unified to the superimposed porous body along the unembossed portions of sheet metal member 9, as for example, in accordance with the aforesaid co-pending application and aforesaid patent. In such manner the unification may be accomplished by thermal treatment to obtain a diffusion bond between sheet metal member 9 and porous metal body 17, or a suitable brazing or soldering material may be coated on and along the unembossed portions of sheet metal member 9, followed by conventional thermal treatment to accomplish the desired unification between these components.

After joining and unifying the embossed sheet metal member and the porous body, the resultant integrated composite structure may be adapted for receiving a fluid by forming an opening 18 through the wall in any of the groove-like indentations followed by the insertion of a suitable inlet conduit 19 which may in turn be connected to a source of fluid, such as a combustible gas.

In addition, the sintered, integrated composite structure may be adapted for receiving a fluid by modification of the pattern of embossments 10 by providing to the embossments an extension thereof which may be designed so as to terminate at an edge of the unit either with or without trimming thereof. A suitable inlet conduit may then be fitted into the terminal opening of this extension.

Any of a number of methods of fabricating the composite structure of the present invention may be generally employed, e.g., reference should be had to the aforesaid co-pending application for a discussion of a plurality of such methods.

Figure 10:
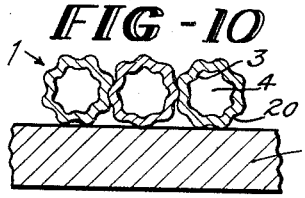
FIGURE 10 is an enlarged portion similar to FIGURE 4 representing another embodiment of the present invention.

The hollow particles of the present invention may be prepared by any of a variety of methods well known in the art. An example is by forming strip metal into a plurality of shapes, either cylindrical, or oval or spherical. The particles may be, as noted above, open-ended, closed-ended or even venturi shaped in order to provide turbulence. In addition, various modifications may include embossing the outer portions of the particles in order to obtain greater surface, as shown at 20 in FIGURE 10.

It may be preferred to orient the particles, that is, to line them up in a like manner such as, for example, all with their open portions thereof facing upwards. This may be done after forming of the particles by orienting devices well known in the art. The oriented particles are then deposited upon a backing paper having an adhesive portion so that the particles remain fixed in a given orientation while in contact with the said adhesive portion. Thereafter, the desired quantity of particles is transferred along with the backing paper to the metal sheet prior to effecting the aforedescribed metallic bond between the particles and the metal sheet.

The hollow particles may be suitably embossed or corrugated in order to add to the available heat transfer surface. In addition, through appropriate shaping of the hollow particles, a funnel effect within each particle may be attained, enhancing the ability of the resulting structure to transfer heat.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composite metal structure comprising: a porous, sintered body of metallic particles bonded to an impervious metal body, said particles being embossed on the outer portions thereof, at least half of said particles being hollow.

2. A composite metal structure according to claim 1 wherein substantially all of said metallic particles are hollow.

3. A composite metal structure comprising: a sheet metal member having a system of distended fluid channels protruding out of one face thereof and a porous, sintered flat body of metallic particles embossed on the outer portions thereof metallically bonded to said member at the non-distended portions thereof, substantially all of said metallic particles being hollow.

4. A composite metal structure comprising: a sheet metal member having distended fluid channels protruding out of one face thereof and a porous, sintered flat body of metallic particles embossed on the outer portions thereof oriented in a predetermined pattern metallically bonded to said member at the non-distended portions thereof, substantially all of said metallic particles being hollow.

References Cited by the Examiner

UNITED STATES PATENTS

| 1,360,928 | 11/20 | Goodwin | 261—95 |
| 2,194,208 | 3/40 | Moran | 159—99 |
| 2,946,681 | 7/60 | Probst et al. | 75—208 |
| 2,985,411 | 5/61 | Madden | 29—192 X |
| 3,049,795 | 8/62 | Valyi | 29—182.3 |
| 3,135,044 | 6/64 | Mote et al. | 29—192 X |

FOREIGN PATENTS 386,754  1/33  Great Britain.

ROBERT A. O'LEARY, *Primary Examiner.*

CHARLES SUKALO, *Examiner.*